(12) United States Patent
Bielek et al.

(10) Patent No.: US 6,387,485 B1
(45) Date of Patent: May 14, 2002

(54) COMPOSITE SUBSTRATE WITH ADHESIVE AND FERROMAGNETIC PROPERTIES

(75) Inventors: Yan P. Bielek, Cumberland, RI (US); William W. Sullivan, Westminister, MA (US)

(73) Assignee: Flexcon Company, Inc., Spencer, MA (US)

( * ) Notice: Subject to any disclaimer, the term of this patent is extended or adjusted under 35 U.S.C. 154(b) by 0 days.

(21) Appl. No.: 09/373,294

(22) Filed: Aug. 12, 1999

(51) Int. Cl.[7] .............................. B32B 7/12; C09J 7/02
(52) U.S. Cl. ...................... 428/343; 428/900; 428/354; 428/344; 428/208; 428/209
(58) Field of Search .................. 428/900, 343, 428/354, 355 R, 208, 344, 209

(56) References Cited

U.S. PATENT DOCUMENTS

| | | |
|---|---|---|
| 2,601,336 A | 6/1952 | Smith-Johannsen |
| 3,078,183 A | 2/1963 | Karalus |
| 3,786,584 A * | 1/1974 | Holson ..................... 40/124 |
| 3,983,276 A | 9/1976 | Matsumoto |
| 4,258,100 A | 3/1981 | Fujitani et al. |
| 4,275,108 A | 6/1981 | Yamaguchi et al. |
| 4,442,152 A * | 4/1984 | Kirk ............................. 428/77 |
| 4,515,850 A | 5/1985 | Ishino et al. |
| 4,546,037 A * | 10/1985 | King .......................... 428/323 |
| 4,686,127 A | 8/1987 | Burns et al. |
| 4,686,141 A | 8/1987 | Burns et al. |
| 4,749,625 A | 6/1988 | Obayashi et al. |
| 4,996,110 A * | 2/1991 | Tanuma et al. ............. 428/343 |
| 5,030,504 A | 7/1991 | Botsolas et al. |
| 5,366,070 A * | 11/1994 | Wolov ........................ 206/214 |
| 5,503,891 A | 4/1996 | Marshall et al. |
| 5,593,759 A | 1/1997 | Vargas et al. |

FOREIGN PATENT DOCUMENTS

| | | |
|---|---|---|
| EP | 0893484 A2 | 1/1999 |
| JP | 60233178 | 11/1985 |

* cited by examiner

*Primary Examiner*—Daniel Zirker
(74) *Attorney, Agent, or Firm*—Samuel, Gauthier & Stevens

(57) ABSTRACT

A flexible composite substrate is disclosed and includes a flexible carrier, a first adhesive and a second adhesive. The first adhesive is adhered to the flexible carrier and includes ferromagnetic material. The second adhesive is adhered to the first adhesive, and is for removably applying the flexible composite substrate to a receiving surface. The adhesive strength of the second material is greater than the adhesive strength of the first material.

9 Claims, 2 Drawing Sheets

COMPOSITE SUBSTRATE WITH ADHESIVE AND FERROMAGNETIC PROPERTIES

BACKGROUND OF THE INVENTION

The invention relates generally to ferromagnetic films and composites, and particularly relates to flexible ferromagnetic composite substrates that may be applied to other substrates and articles.

Ferromagnetic films are generally films that include a magnetic material or a material that is capable of being magnetized. Such films are ubiquitous, finding application in a wide variety of commercial and educational uses. Flexible ferromagnetic films and composites are particularly suitable for a variety of uses including novelty items, white boards, advertisements, and hosts of applications for temporary signage.

Although such ferromagnetic films generally attach or stick well to magnetic and certain other metallic surfaces, they do not attach well to all surfaces such as those including glass, plastic, wood, paper etc. Materials and composites that include ferromagnetic material and an exposed adhesive material are known to be suitable for use in joining two articles together in a sandwich construction, but such composites are not suitable for use in applications where the composite includes a print receptive material that is exposed during use. For example neither the magnetic strips (20) disclosed in U.S. Pat. No. 5,366,070 nor the marker tape (10) disclosed in U.S. Pat. No. 4,442,152, are suitable for use in temporary signage, at least, because they are designed to be permanently sandwiched between other articles. U.S. Pat. No. 4,996,110 (the '110 patent) discloses a white board including a layer of sheet-like magnet (5) adhered by an adhesive (3) to a polyester film (2). The sheet-like magnet (5) is disclosed to have magnetic properties as well as a light adhering property. The '110 patent discloses that white boards of the '110 patent are preferably used for application to steel surfaces wherein the light adhesive property inhibits movement of the white board during use. The '110 patent also discloses that due to the light adhering property, the white board may be adhered to glass, decorative wood plate, and coated aluminum plates. Such white boards, however, do not exhibit sufficient adhesion to non-ferrous metallic surfaces to be suitable for a wide variety of uses. This is, in part, due to the fact that increasing the ratio by weight of ferromagnetic material to adhesive material in the sheet-like magnet generally decreases the adhesive strength of the adhesive material, while decreasing the ratio by weight of ferromagnetic material to adhesive material detracts from the magnetic strength of the sheet-like material.

There is a need, therefore, for a substrate that exhibits sufficient adhesive and ferromagnetic properties to be suitable for use in a wide variety of applications. Specifically, there is a need for a substrate that provides a strong adhesive force on its surface, yet also includes sufficient ferromagnetic material that the substrate may either produce a strong magnetic field or respond sufficiently to a strong magnetic field.

SUMMARY OF THE INVENTION

The invention provides a flexible composite substrate that includes a flexible carrier, a first adhesive and a second adhesive. The first adhesive is adhered to the flexible carrier and includes ferromagnetic material. The second adhesive is adhered to the first adhesive, and removably applies the flexible composite substrate to a receiving surface. The second adhesive has an adhesive strength that is greater than the adhesive strength of the first material. In various embodiments, composites of the invention may include carriers that are removable from the composite after the composite is applied to a receiving surface.

BRIEF DESCRIPTION OF THE DRAWINGS

The following detailed description of the illustrated embodiments may be further understood with reference to the accompanying drawings in which.

The drawings are for illustrative purposes only and are not to scale.

DETAILED DESCRIPTION OF THE ILLUSTRATED EMBODIMENTS

Figure 1:
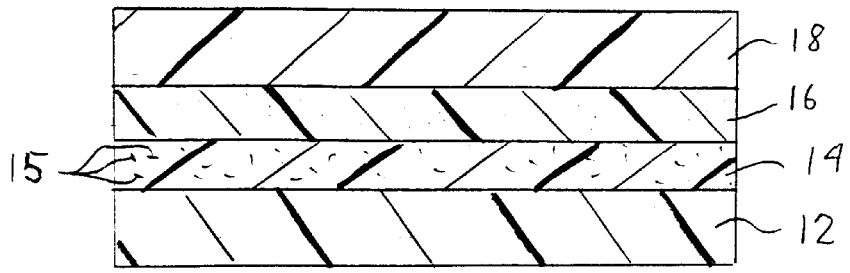
FIG. 1 shows an illustrative view of a composite structure in accordance with an embodiment of the invention.

As shown in FIG. 1, a composite substrate 10 of an embodiment of the invention includes a flexible carrier film 12 that may be formed of any of a variety of polymers, including but not limited to polyacetate, polyacrylate, polyester, polyethylene, polypropylene, other polyolefins and mixed polyolefins, polyvinyl chloride, polyimides, polyamides, polyurethanes, polystyrene, as well as numerous polystyrene blends and graft polymers. The film 12 may be clear or colored, and may be print receptive in various embodiments. The film 12 may be rendered print receptive by coating, co-extruding, and plasma deposition, as well as various further techniques for oxidizing materials. Also, various inks exhibit a particular adhesion to certain films, which facilitates printing on such films. In further embodiments, the print receptive material may be erasable, and composites of the invention may be used for white boards. For example, the material may be designed to provide that the ink remain on the surface of the material (instead of penetrating the material), and the ink may therefore be easily wiped from the material as desired.

The composite substrate 10 of FIG. 1 further includes a layer 14 that includes a ferromagnetic material 15 in, for example, a powdered or particulate form. The ferromagnetic material 15 may be any of steel, iron oxide ferrite, magnetite, iron, nickel, cobalt, etc., and the size of the particles may be between 1 nm to 5 mm. The particles are dispersed into a flexible binder which may be formed of polyurethane, polyester, and polyolefins, as well as a pressure sensitive adhesive. Adding a sufficient amount of the ferromagnetic material to a binder formed of a pressure sensitive adhesive, however, significantly decreases the strength (or tack) of the pressure sensitive adhesive. The ratio by weight of ferromagnetic material to binder material may be from about 4/10 to about 9/1, and is preferably in the range of about 7.5/2.5 to about 9/1. The binder material should also permit uniform distribution of the ferromagnetic material within the binder, and form a sufficient adhesion with the film 12.

As an example, the ferromagnetic adhesive layer 14 may be formed of 85 parts stainless steel particulate 410L with a particle size rated at 325 mesh as sold by Ametek, Specialty Products Division, of the town of Eighty Four, Pa. The resin may be formed of 15 parts (solids) of VITEL™ 3350 polyester resin as sold by Bostic, Inc. of Middleton, Mass. The VITEL™ resin together with the stainless steel particulate, adheres sufficiently well to the carrier, but would not adhere sufficiently well to a wide variety of receiving surfaces to which composites of the invention may be applied. The combined VITEL™ ferromagnetic coating may be applied to several types of films, such as a 2 mil thick white polyester film. This coating may be applied to a thickness in the range from about 1 to 10 mils, and is preferably in the range of about 2 to 5 mils.

A layer of pressure sensitive adhesive 16, together with a release liner 18 may then be applied to the ferromagnetic adhesive layer 14. The pressure sensitive adhesive 16 may be formed of an acrylic such as Robond 7627 as sold by Rohm & Haas of Philadelphia, Pa.; or Acrylic 80-1054 as sold by National Starch and Chemical Co. in Somerville, N.J. or GMS 788 as sold by Solutia of Springfield, Mass.; or may be a rubber based pressure sensitive adhesive such as PSA 36-6083 as sold by National Starch and Chemical Company. The adhesive may be deposited to a thickness in the range of about 0.7 mils to about 5.0 mils, and is preferably in the range of about 1.0 mils to about 2.0 mils.

In various embodiments, composites of the invention may be incorporated into a polymeric sheet, or combined with polymeric material through processes such as co-extrusion, extrusion coating, and laminating. For example, a white polyester film may be extrusion coated with the ferromagnetic adhesive layer. Such a composite may be printed or decorated, and affixed to other articles to produce wall displays or other commercial or educational graphic displays.

Figure 2A:
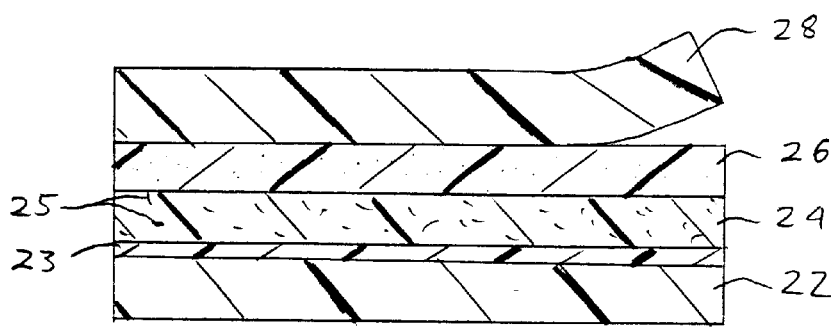
FIGS. 2A–2C show illustrative views of a composite structure in accordance with another embodiment of the invention.
Figure 2B:
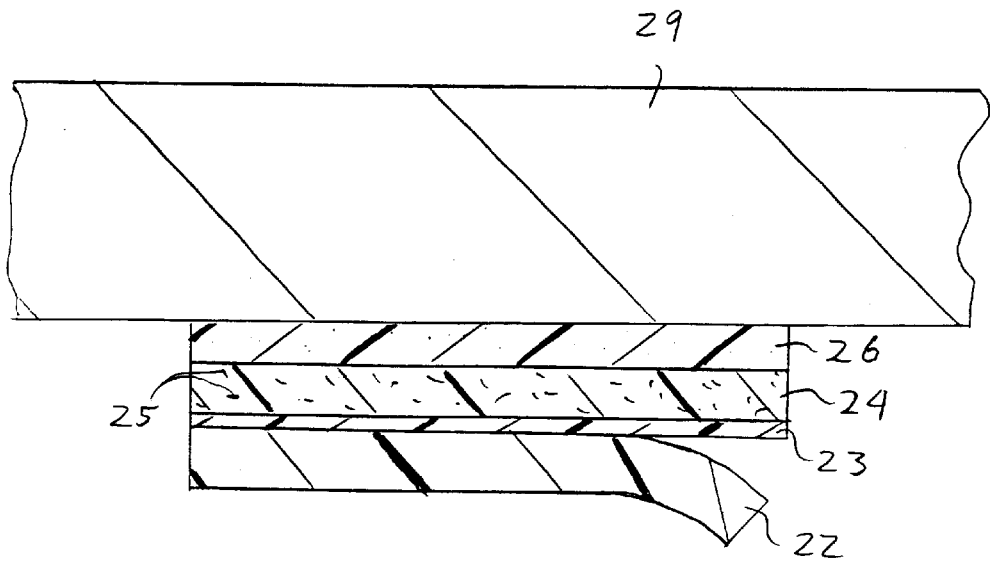
Figure 2C:
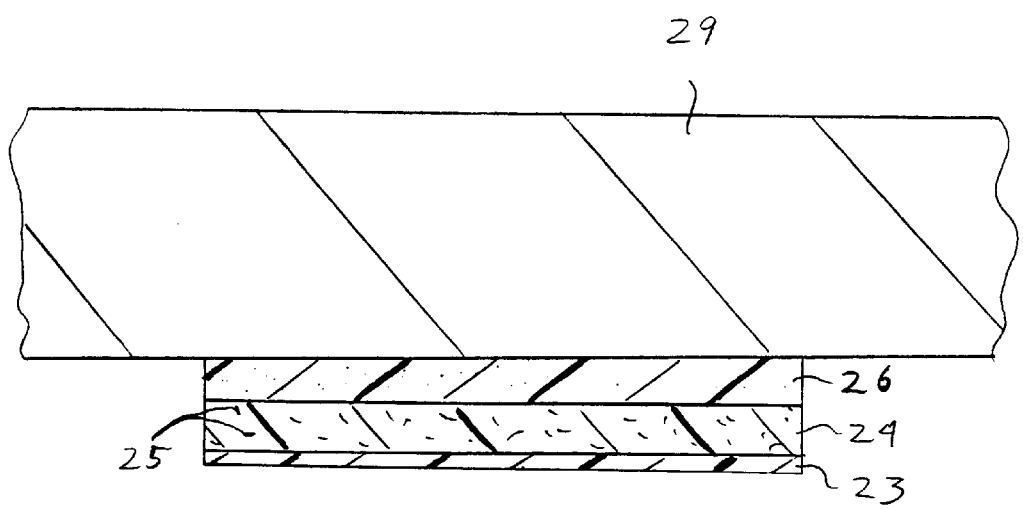

As shown in FIGS. 2A–2C, in another embodiment, a composite of the invention 20 may include a separable (and optionally printable) carrier 22, a ferromagnetic adhesive layer 24, a layer of pressure sensitive adhesive 26, and a release liner 28. The ferromagnetic adhesive layer includes ferromagnetic particulate material 25 as discussed above, and further includes a coating 23 of a print receptive material thereon. During use, the release liner 28 may be removed (as shown in FIG. 2A), and the composite may be applied to a receiving surface 29 (as shown in FIG. 2B). The bond between the carrier 22 and the coating 23 of the ferromagnetic adhesive layer 24 may be achieved by selection of materials such that the coating 23 and layer 24 have simile surface energies. This bond should be less strong than the adhesive bond between the adhesive 26 and the receiving surface 29. As shown in FIG. 2C, the carrier 22 may then be separated from the remaining composite, leaving the ferromagnetic adhesive material 24 (with the coating 23) and the pressure sensitive adhesive 26 on the article 29. This procedure permits extremely thin frangible composites of the invention to be applied to a wide variety of articles. Such frangible composites, in fact, lack sufficient structural strength to maintain their structural integrity if they are not in contact with (and thereby supported by) either a carrier or a receiving surface. In further embodiments, a heat activated adhesive may be employed in a composite that is extrusion or in-mold laminated to a polymeric substrate.

Composite substrates of the invention may be used to form a wide variety of items such as novelty items, white board surfaces, advertisements, and temporary signage etc. Composites of the invention are receptive to magnets, permitting such composites to be used together with other articles to render the other articles receptive to magnets. For example, a composite of the invention may be applied to some or all of a non-ferromagnetic surface via the adhesive. Magnets, such as flexible magnets bearing graphics or text (as well as other types of magnets) may then be applied to the composites. Since the adhesive is designed to be a temporary adhesive, the composites may later be removed, stored, and re-used.

In further embodiments, by choosing the proper metal to metal oxide ratio, the resulting magnetically susceptible coating may be modified to be a magnetic coating via a post-coating exposure to a high magnetic field. Such a composite (with a magnetized material on the surface) suitable for use with games and promotional items where a flat magnetic surface is desirable, and the structural components are non-magnetic.

Those skilled in the art will appreciate that modifications and variations may be made to the above disclosed embodiments without departing from the spirit and scope of the invention.

What is claimed is:

1. A flexible composite substrate comprising:
   a flexible carrier;
   a first adhesive adhered to said flexible carrier, said first adhesive including ferromagnetic material and having a first adhesive strength; and
   a second adhesive adhered to said first adhesive, said second adhesive for removably applying said flexible composite to a receiving surface, and having a second adhesive strength that is greater than said first adhesive strength.

2. A flexible composite substrate as claimed in claim 1, wherein said flexible carrier may be separated from said first adhesive after said composite is applied via said second adhesive to the receiving surface.

3. A flexible composite substrate as claimed in claim 1, wherein said flexible carrier includes a print receptive surface thereon.

4. A flexible composite substrate comprising:
   a flexible carrier;
   a first layer on one side of said flexible carrier, said first layer having a first adhesive strength and including ferromagnetic material, a first adhesive material for adhering said first layer to said flexible carrier, and a print receptive surface on one side thereof; and
   a second layer including a pressure sensitive second adhesive on said first layer for removably applying said flexible composite substrate to a receiving surface, said second adhesive having a second adhesive strength that is greater than said first adhesive strength.

5. A flexible composite substrate as claimed in claim 4, wherein said flexible carrier may be separated from said first layer after said composite substrate is applied via said second adhesive to the receiving surface.

6. A flexible composite substrate comprising:
   a flexible carrier;
   a frangible first layer on one side of said flexible carrier, said frangible first layer including ferromagnetic material, a first adhesive material having a first adhesive strength for adhering said frangible first layer to said flexible carrier, and a print receptive surface on one side thereof; and
   a frangible second layer including a second adhesive having a second adhesive strength that is greater than said first adhesive strength on said flexible carrier for removably applying said frangible first layer and said frangible second layer to a receiving surface.

7. A method of forming a flexible composite substrate comprising the steps of:
   providing a flexible carrier;
   applying a first adhesive to one side of said flexible carrier, said first adhesive having a first adhesive strength and including ferromagnetic material; and applying a second adhesive to said first adhesive, said second adhesive having a second adhesive strength that is greater than said first adhesive strength.

8. A method of forming a flexible composite substrate as claimed in claim 7, wherein said method further comprises the step of applying said composite substrate to a receiving surface.

9. A method of forming a flexible composite substrate as claimed in claim 8, wherein said method further comprises the step of separating said carrier from said first adhesive after said second adhesive has been applied to said receiving surface.

* * * * *

(12) EX PARTE REEXAMINATION CERTIFICATE (7239th)
United States Patent
Bielek et al.

(10) Number: US 6,387,485 C1
(45) Certificate Issued: Dec. 15, 2009

(54) COMPOSITE SUBSTRATE WITH ADHESIVE AND FERROMAGNETIC PROPERTIES

(75) Inventors: Yan P. Bielek, Cumberland, RI (US); William W. Sullivan, Westminister, MA (US)

(73) Assignee: Flexcon Company, Inc., Spencer, MA (US)

Reexamination Request:
No. 90/009,337, Nov. 17, 2008

Reexamination Certificate for:
Patent No.: 6,387,485
Issued: May 14, 2002
Appl. No.: 09/373,294
Filed: Aug. 12, 1999

(51) Int. Cl.
*B43L 1/00* (2006.01)
*B43L 1/04* (2006.01)
*C09J 7/02* (2006.01)

(52) U.S. Cl. .................. 428/343; 428/208; 428/209; 428/344; 428/354; 428/900

(58) Field of Classification Search .................. None
See application file for complete search history.

(56) References Cited

U.S. PATENT DOCUMENTS 5,609,788 A   3/1997   Deetz
5,843,329 A   12/1998  Deetz

*Primary Examiner*—Stephen J Stein

(57) ABSTRACT

A flexible composite substrate is disclosed and includes a flexible carrier, a first adhesive and a second adhesive. The first adhesive is adhered to the flexible carrier and includes ferromagnetic material. The second adhesive is adhered to the first adhesive, and is for removably applying the flexible composite substrate to a receiving surface. The adhesive strength of the second material is greater than the adhesive strength of the first material.

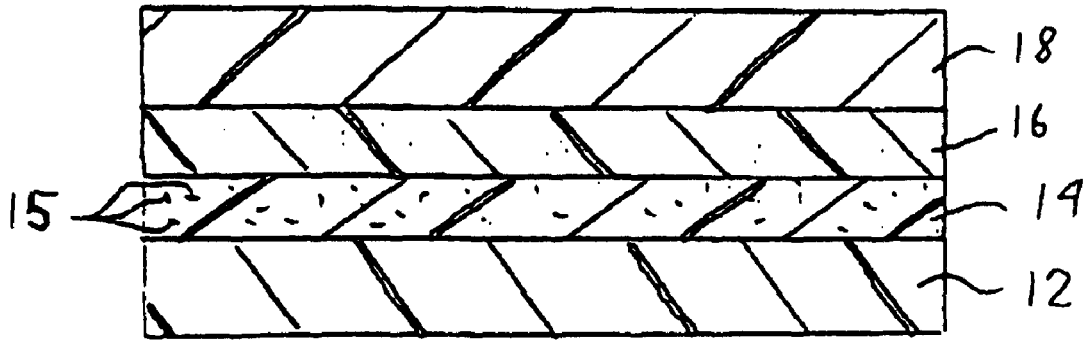

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 9 is confirmed.

Claims 1–8 are cancelled.

\* \* \* \* \*